United States Patent [19]

Baskwell et al.

[11] 4,450,317

[45] May 22, 1984

[54] HIGH VOLTAGE, GAS-FILLED ELECTRIC CABLE WITH SPACERS BETWEEN CONDUCTOR AND SHEATH

[75] Inventors: John A. Baskwell, Winchester; Christopher Larrive, Southampton, both of England

[73] Assignee: Pirelli General Public Limited Company, London, England

[21] Appl. No.: 345,578

[22] Filed: Feb. 4, 1982

[30] Foreign Application Priority Data

Feb. 13, 1981 [GB] United Kingdom ................ 8104595

[51] Int. Cl.³ ...................... H01B 9/06; H01B 13/22; H02G 1/00

[52] U.S. Cl. ...................................... 174/27; 156/51; 174/10; 174/28; 425/370

[58] Field of Search ...................... 174/10, 24, 27, 28, 174/29

[56] References Cited

U.S. PATENT DOCUMENTS

| | | | |
|---|---|---|---|
| 3,391,243 | 7/1968 | Whitehead | 174/28 |
| 3,792,188 | 2/1974 | Cronin | 174/28 |
| 3,814,832 | 6/1974 | Cronin | 174/28 |

FOREIGN PATENT DOCUMENTS

| | | | |
|---|---|---|---|
| 822676 | 9/1927 | France | 174/28 |
| 362177 | 8/1938 | Italy | 174/28 |
| 308349 | 4/1930 | United Kingdom | 174/28 |
| 547690 | 9/1942 | United Kingdom | 174/28 |
| 1280762 | 7/1972 | United Kingdom | 174/27 |
| 1322852 | 7/1973 | United Kingdom | 174/28 |

*Primary Examiner*—Laramie E. Askin
*Attorney, Agent, or Firm*—Brooks, Haidt, Haffner & Delahunty

[57] ABSTRACT

An electrical cable for very high voltage underground power transmission comprises two or more inner conductors (2) which are twisted together and are supported within the gas-filled void of a hollow extruded plastic cable sheath (4) by means of a plurality of spacers (3) which are positioned along the length of the cable, each spacer (3) being formed of solid dielectric material with a number of angularly spaced radial webs equal to the number of conductors in the cable and being engaged with the twisted conductors with the webs extending from the cable axis radially outwardly between the conductors into contact with the inner wall of the cable sheath (4) where the outermost ends of the webs engage with complementarily shaped portions (5) of the sheath (4) providing for reduction of the electrical stresses at the spacer ends. The cable is formed by extrusion of the sheath over the twisted core conductors after insertion of the spacers, and is vacuum corrugated after extrusion, the corrugator being specially formed and operated so as to accommodate the locations whereat the spacer ends engage with and locally deform the extruded sheath. The plastic sheath can be formed with multiple layers by a multiple extrusion process, and a metal outer sheath may be formed integrally with the cable and may have corrugations which mate closely with the corrugations of the plastic sheath.

7 Claims, 6 Drawing Figures

HIGH VOLTAGE, GAS-FILLED ELECTRIC CABLE WITH SPACERS BETWEEN CONDUCTOR AND SHEATH

This invention concerns improvements in or relating to electric cables and particularly concerns electric cables with compressed gas insulation.

Cables using compressed gas insulation, particularly using sulphur hexafluoride, have been proposed for use in very high voltage underground power transmission systems, for example for connecting cross-country, pylon-supported overhead cables into urban situations. In British Patent Specification No. 1,280,762 (Central Electricity Generating Board), the problems associated with compressed gas insulated cables are briefly described, particularly the problem of ensuring that electrical stresses established when the cable is under load do not exceed the breakdown voltage of the compressed gas insulation. As is described in British Specification No. 1,280,762, electrical stress problems are reduced by locating the cable within a large diameter conductive sheath, diameters of the order of 500 mm being not unusual. With such large cable diameters, it is not particularly practical to manufacture the cable integrally with the conductive sheath in the factory and instead it has been more convenient to introduce the cable into the sheath on site, spacers being utilized for maintaining the cable conductors uniformly spaced from the sheath after introduction of the conductors into the sheath on site.

In the arrangement described in British Specification No. 1,280,762, the outer cable sheath is constituted by a metal pipe which can be corrugated for flexibility. The cable has two or more inner conductors which are twisted around each other, and a series of spacers are positioned along the length of the cable, each spacer being formed of a solid dielectric material and having a number of radial webs equal to the number of conductors, the webs extending from the axis of the cable radially outwardly between the conductors. To maintain factory cleanliness of the cable in the case where the cable is inserted into its sheath on site, it is proposed to provide the conductor assembly of the cable within a plastic sheath which is stripped off as the conductor assembly is fed into the pipe line which in the finished cable constitutes the outer conductive sheath of the cable.

The disadvantage which arises with the arrangement of British Patent Specification No. 1,280,762 is that, neither in the case where the cable conductor assembly is fed into a sheathing pipeline on site nor in the case where the metallic sheath is factory formed as an integral part of the cable, can it be guaranteed that the void of the cable which is to be filled with a compressed gas insulator is free from contamination, particularly from metallic particulate contamination which can lead to insulation breakdown. Where the sheath is factory formed as an integral part of the cable, metallic particles will virtually inevitably be present in the cable voids. Where the cable is to be fed into a metallic pipe on site, the sheathing of the cable conductor assembly in a removable plastic coating enables the conductor assembly per se to be maintained in factory clean condition, but only until such a time as the coating is stripped off.

In accordance with the present invention, a compressed gas insulated cable comprises a circumferentially corrugated tubular sheath of plastic material which may incorporate an electrically conductive component, the said sheath being formed by extrusion over a conductor assembly comprising one or more conductors and spacers having radial webs engaged at their outermost ends with complementarily shaped portions of the sheath providing for reduction of the electrical stresses at the spacer ends. The sheath may comprise a plastic material loaded with electrically conductive particles, and may be formed simultaneously (by a double extrusion process, for example) with an electrically insulating layer, and the requisite corrugation of the sheath to ensure flexibility may be obtained by extrusion of the sheath into the operating zone of a proprietary vacuum corrugator for example.

The gas insulated cable according to the present invention is thus formed entirely under factory conditions and it can readily be arranged that the gas insulation voids in the cable are free of contamination both during manufacture of the cable and thereafter. A metal outer sheath may be formed integrally with the cable, in which case the metal outer sheath will preferably be corrugated with its corrugations mating closely with those of the plastic sheath, or alternatively the cable may be inserted into a metal or other duct on site; in either case, the gas insulation voids within the cable are protected by the plastic sheath and are not subject to contamination.

The invention will best be understood from consideration of the following detailed description of an exemplary embodiment thereof together with methods of manufacturing the same, the embodiment and methods aforementioned being illustrated in the accompanying drawings wherein.

Figure 1:
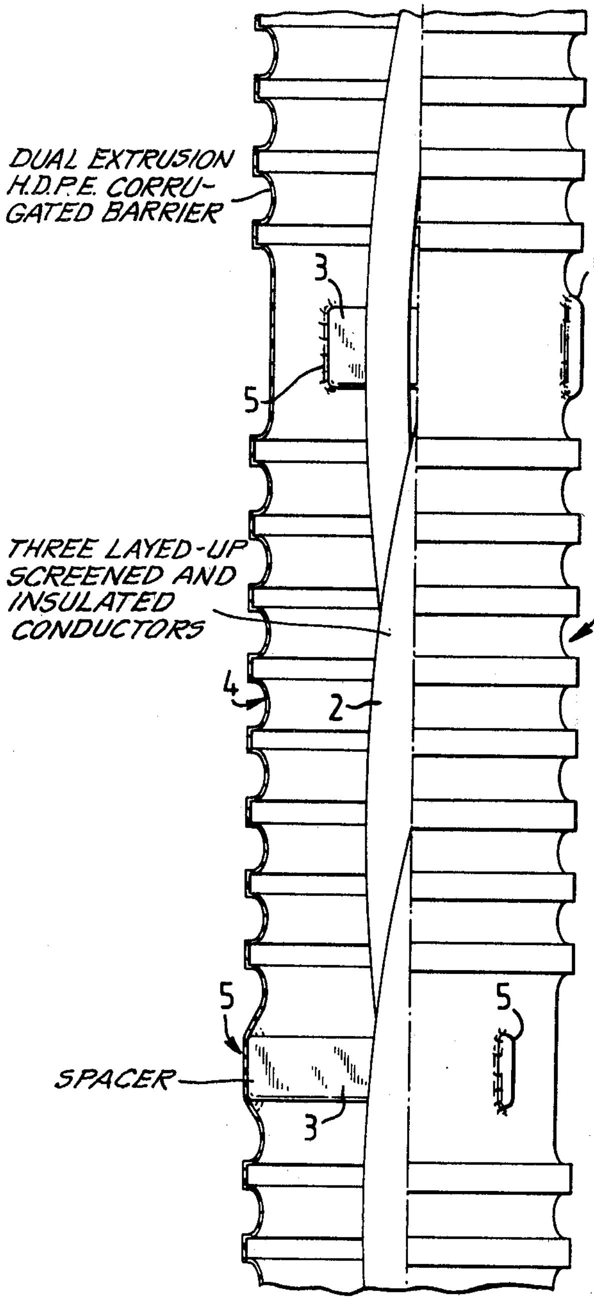
FIG. 1 is an elevational view, cut away on one axial side to show the cable interior, of a gas insulation cable in accordance with the teachings of the invention.
Figure 2:
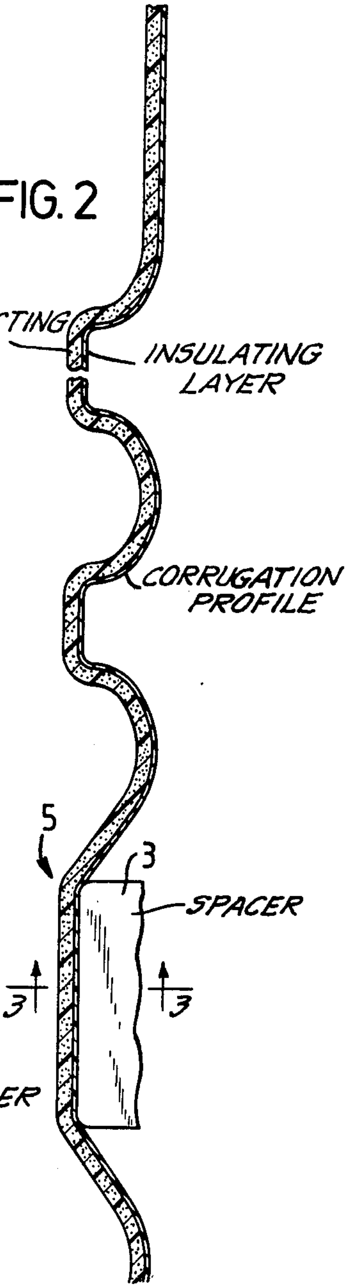
FIG. 2 is a sectional view of a portion of the corrugated plastic sheath of the cable of FIG. 1 showing the mating of the spacer ends with the corrugations.
Figure 3:
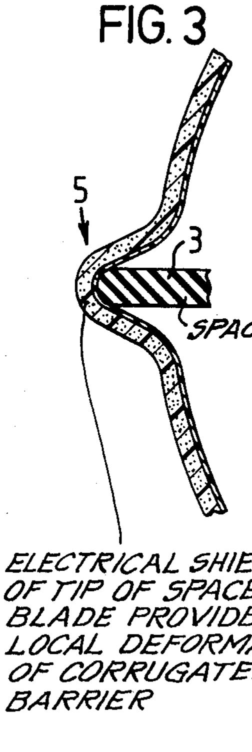
FIG. 3 is a cross-section on the line 3—3 of FIG. 2.

Referring first to FIGS. 1, 2 and 3, the cable 1 comprises a conductor assembly 2 with spaced apart spacers 3 which may be as described in British Patent Specification No. 1,280,762 aforementioned. The conductor/-spacers assembly 2, 3 is contained within a hollow plastic material sheath 4 which is circumferentially corrugated as shown. The outermost extremities of the spacers 3 are received in complementarily-shaped deformations 5 in the sheath 4, and it will be appreciated from a consideration of FIGS. 2 and 3 particularly that this configuration provides for electrical shielding of the spacer blade tips with corresponding reduction in electrical stressing at the tips. As shown in FIG. 2, the plastic material sheath 4 can have an inner, electrically insulating layer and an outer, conductive or semi-conducting layer; in a cable of overall diameter of the order of 225 mm for example, the inner layer might have a thickness of the order of 1 mm for example and the outer layer might have a thickness of 3 mm for example. The sheath 4 might for example be formed of heavy duty polyethylene.

Figure 4:
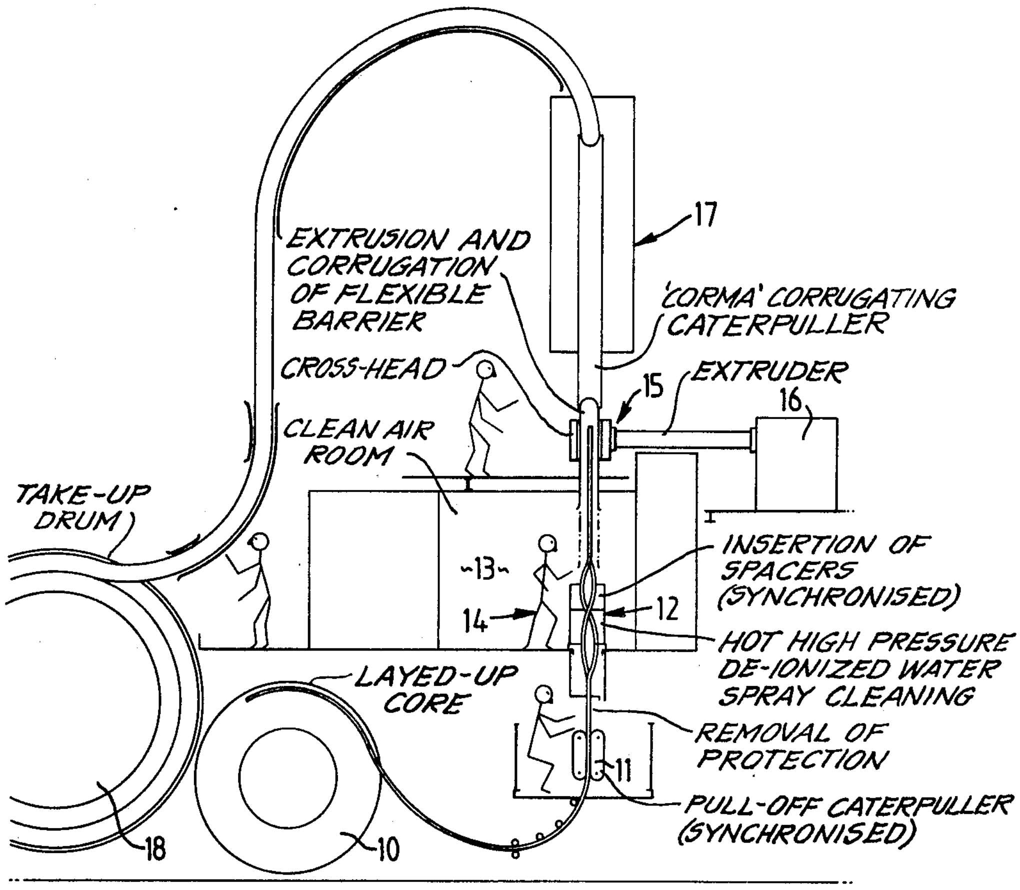
FIG. 4 is a schematic showing of an exemplary manufacturing facility for production of cable as in FIG. 1.

Referring now to FIG. 4, a schematic assembly line for manufacture of the cable of FIGS. 1 to 3 is shown. The layed-up cable core assembly is pulled off a reel 10 by means of a proprietary "caterpuller" device 11 which feeds the cable cores to a cleaning station 12 where hot, de-ionized water is sprayed under pressure at the cores. From the cleaning station 12 the cable cores pass into the environment of a clean air room 13 where an operator 14 attends to the synchronous insertion of the spacers between the cable cores. The cores/-spacers are conveyed thence to the head 15 of an extruder 16 where the plastic material sheath is applied, and from there the sheathed cable cores pass through a proprietary vacuum corrugator 17 such as the CORMA corrugator for example. From there, the sheathed cable passes to take-up reel 18.

Figure 5:
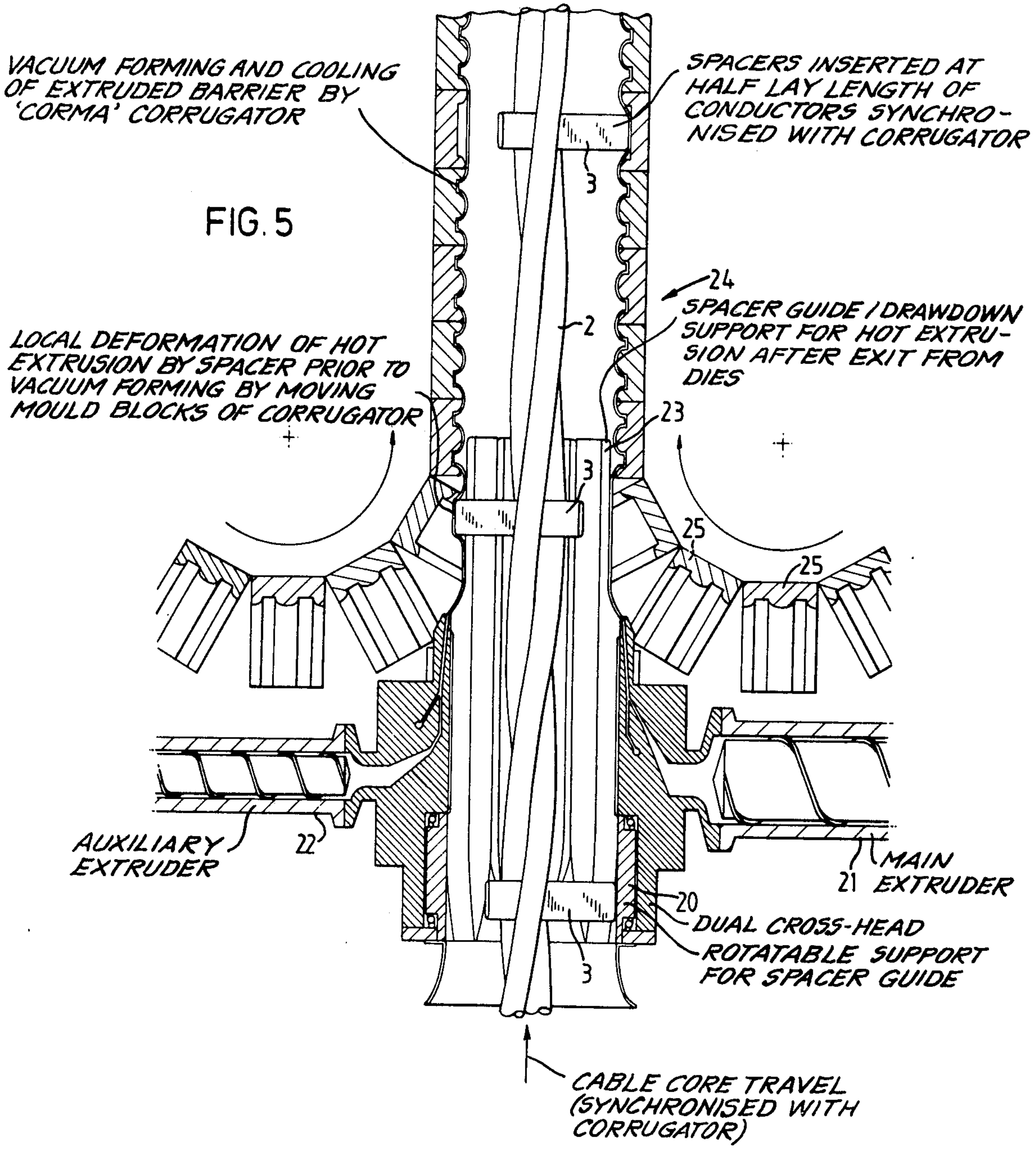
FIG. 5 shows in more detail the extruder head and corrugator arrangement of the facility of FIG. 4.

FIG. 5 shows the extruder head and following corrugator in more detail. The arrangement is necessarily such as to obtain synchronisation of insertion of spacers with the advance of the cable cores to and through the extruder and the operation of the corrugator, and any suitable and convenient means may be employed for achieving this. As shown, the extruder head incorporates a rotatable guide and support 20 for spacers 3 inserted into the apparatus, and comprises main and auxiliary extruders 21 and 22 for the outer and inner layers respectively of the cable sheath. A spacer guide/-drawdown support 23 extends through the extruder head and beyond the dies for defining the extent of drawdown of the extruded tubular sheath as is vital for ensuring registry of the tips of the spacer limbs with deformations in the wall of the extruded sheath; as can be seen, the diameter defined by the tips of the spacer limbs is greater than the final drawn-down diameter of the extruded sheath.

As the extruded sheath passes from the end of the drawdown support 23, it is engaged by the CORMA corrugator 24 which has circulating "caterpullar" mould blocks 25 which serve (in per se known manner) to vacuum form and cool the extruded sheath. As can be seen, the spacers are received at appropriately formed mould blocks spaced apart from one another by one-half of the lay length of the twisted cable cores, these specially formed mould blocks accommodating the deformations caused in the extruded sheath by the tips of the spacers.

Figure 6:
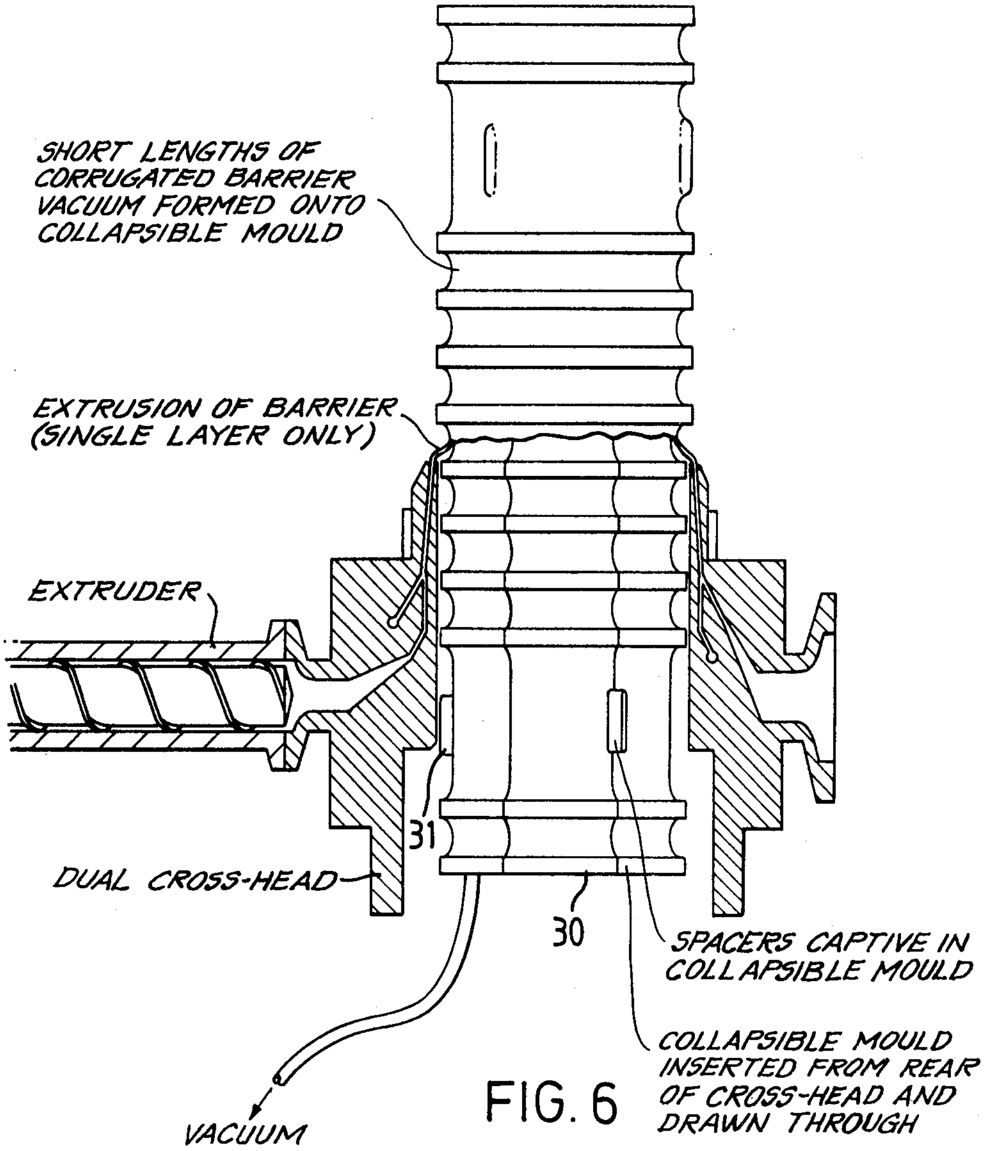
FIG. 6 shows an alternative manufacturing facility appropriate only to production of relatively short cable runs.

Whereas the method illustrated in FIGS. 4 and 5 is a continuous manufacturing method, FIG. 6 illustrates a method which is appropriate only to manufacture of discontinuous short lengths. An extruder similar to that of FIG. 5 is employed, and a collapsible mould 30 having spacers 31 captive therein is passed through the extruder head so that a layer of material is extruded over the mould. By applying a vacuum to the mould, the extruded sheath will be formed into the corrugations of the mould. The mould can then be collapsed and removed. The method of FIG. 6 is not recommended as a viable method of manufacturing production lengths of cable, but rather represents a ready method for making short cable lengths for example for testing purposes.

The gas insulated cable constructed in accordance with the invention thus is formed in the factory with the conductors/spacers assembled integrally with the plastic material sheath and, by sealng its ends for transportation of the cable to the installation site, the gas voids in the cable can be kept as clean as when the cable is formed. The plastic material sheath can be made of sufficient strength to contain the anticipated internal gas pressures, or alternatively and as previously mentioned, a metallic outer casing can be provided. The cable may be laid on site, as it is, in a specially prepared trench, particularly in the case of a cable having a metal outer casing which may have additional anticorrosive outer layers, but it is anticipated that the cable will normally be laid in a pipe or duct which can be formed of metal or earthenware or concrete, or in a metal reinforced plastic composite pipe for example.

Various alternatives and modifications are possible within the general ambit of the invention. For example, hereinbefore described have been a continuous manufacturing process illustrated in FIG. 4, and a discontinuous process, primarily envisaged as having application to production only of short lengths of cable, as illustrated in FIG. 6. A further possibility is a discontinuous process which might be used for manufacturing lengths of say 100 meters or thereabouts. In accordance with this alternative, a modification of the process described with reference to FIG. 4 might be such that the corrugation of the extruded sheath is not effected immediately following extrusion, but instead the sheath is extruded around the conductors/spacers and allowed to run out in the horizontal plane thereby producing a straight, uncorrugated cable length which subsequently is subjected to corrugation. The subsequent corrugation may be effected at the same or a different location and with or without cutting the cable, and particulary its extruded sheath, for example by means of a corrugator arranged to reheat the extruded sheath and apply the corrugations by means of vacumn formers, such corrugator being arranged either to move along the length of the extruded cable sheath or to have the cable sheath advanced through it, provision being made to coordinate the corrugator operation with the locations of the spacers.

We claim:

1. An electric power cable for transmitting electric power, said cable comprising:

a plurality of separate, inner conductors which are twisted together;

an integrally formed, extruded plastic sheath surrounding said twisted conductors and having an internal diameter substantially greater than the overall external diameter of the twisted conductors whereby a void is defined around the twisted conductors within the sheath;

an insulating gas in said void around the twisted conductors;

a plurality of spacers supporting the plurality of twisted conductors within the plastic sheath at locations which are spaced apart from one another along the axis of the cable, each of said spacers being formed of solid dielectric material and having a number of generally radial webs engaged with the twisted conductors and extending into contact with the inner wall of said plastic sheath, each inner conductor being between a different pair of the generally radial webs;

said plastic sheath having a plurality of recesses at the inner wall thereof which correspond to and receive the outermost ends of the generally radial webs, each said recess having a wall which engages and at least partially surrounds the outermost end of the generally radial web received thereby and the wall of each recess complementing in shape the shape of the end of the generally radial web received thereby thus providing for reduction of the electrical stresses at the outermost ends of said generally radial webs.

2. An electric power cable as claimed in claim 1 wherein said extruded plastic sheath is circumferentially corrugated, and said recesses are local deformations of the corrugated sheath around the ends of the webs.

3. An electric power cable as claimed in claim 2 further comprising an integral metal outer sheath.

4. An electric power cable as claimed in claim 2 wherein said insulating gas comprises sulphur hexafluoride at a pressure above atmospheric pressure.

5. An electric power cable as claimed in claim 1 wherein the extruded plastic sheath comprises an inner insulating layer and an outer semiconducting layer.

6. An electric power cable as claimed in claim 1 further comprising an integral metal outer sheath.

7. An electric power cable as claimed in claim 1 wherein said insulating gas comprises sulphur hexafluoride at a pressure above atmospheric pressure.

* * * * *